(12) United States Patent  
Hogg, Jr.

(10) Patent No.: US 9,020,114 B2  
(45) Date of Patent: Apr. 28, 2015

(54) SYSTEMS AND METHODS FOR DETECTING A CALL ANOMALY USING BIOMETRIC IDENTIFICATION

(75) Inventor: John S. Hogg, Jr., Bedford, TX (US)

(73) Assignee: Securus Technologies, Inc., Dallas, TX (US)

( * ) Notice: Subject to any disclaimer, the term of this patent is extended or adjusted under 35 U.S.C. 154(b) by 664 days.

(21) Appl. No.: 11/603,960

(22) Filed: Nov. 22, 2006

(65) Prior Publication Data

US 2008/0118042 A1    May 22, 2008

(51) Int. Cl.
| | |
|---|---|
| H04M 3/00 | (2006.01) |
| H04M 3/22 | (2006.01) |
| H04M 3/38 | (2006.01) |
| H04M 1/68 | (2006.01) |
| H04M 3/58 | (2006.01) |

(52) U.S. Cl.
CPC .............. *H04M 3/2281* (2013.01); *H04M 3/38* (2013.01); *H04M 1/68* (2013.01); *H04M 3/58* (2013.01); *H04M 2201/41* (2013.01)

(58) Field of Classification Search
USPC ......... 379/93.03, 114.01, 114.14, 32.01, 188, 379/189, 202.01; 455/411, 26.1
See application file for complete search history.

(56) References Cited

U.S. PATENT DOCUMENTS

| | | | |
|---|---|---|---|
| 4,843,377 | A | 6/1989 | Fuller et al. |
| 4,993,062 | A | 2/1991 | Dula et al. |
| 4,999,613 | A | 3/1991 | Williamson et al. |
| 5,170,426 | A | 12/1992 | D'Alessio et al. |
| 5,185,781 | A | 2/1993 | Dowden et al. |
| 5,195,126 | A | 3/1993 | Carrier et al. |
| 5,210,789 | A | 5/1993 | Jeffus et al. |
| 5,319,702 | A | 6/1994 | Kitchin et al. |
| 5,485,507 | A | 1/1996 | Brown et al. |
| 5,517,555 | A | 5/1996 | Amadon et al. |
| 5,539,812 | A | 7/1996 | Kitchin et al. |
| 5,604,792 | A | 2/1997 | Solomon et al. |
| 5,627,887 | A | 5/1997 | Freedman |
| 5,655,013 | A | 8/1997 | Gainsboro |
| 5,745,558 | A | 4/1998 | Richardson et al. |
| 5,768,355 | A | 6/1998 | Salibrici et al. |
| 5,796,811 | A | 8/1998 | McFarlen |
| 5,805,685 | A | 9/1998 | McFarlen |
| 5,832,068 | A | 11/1998 | Smith |

(Continued)

OTHER PUBLICATIONS

U.S. Appl. No. 10/135,878, filed Apr. 29, 2002.

(Continued)

*Primary Examiner* — Paul S Kim

(74) *Attorney, Agent, or Firm* — Fogarty, L.L.C.

(57) ABSTRACT

Embodiments of the present invention are directed generally to use of biometric identification during a call for detecting an anomaly occurring in the call, such as a change in the parties participating on the call. Communication between parties of a call is monitored and biometric identification is performed using the communication. According to one exemplary embodiment, biometric prints, such as voice prints, face prints, etc., are obtained for parties that are authorized to participate on a call. The call is then monitored and biometric data (e.g., audio, video, etc.) captured from communication during the call is compared with the biometric prints of the authorized parties to detect changes in the parties participating on the call, such as a new, unauthorized party joining the call. Thus, a call processing system can detect anomalies occurring during monitored calls, such as three-way calling, a handoff of a call, etc.

36 Claims, 4 Drawing Sheets

(56) References Cited

U.S. PATENT DOCUMENTS

| | | | |
|---|---|---|---|
| 5,872,834 A | 2/1999 | Teitelbaum | |
| 5,883,945 A | 3/1999 | Richardson et al. | |
| 5,926,533 A | 7/1999 | Gainsboro | |
| 5,978,450 A | 11/1999 | McAllister et al. | |
| 6,038,305 A | 3/2000 | McAllister et al. | |
| 6,067,347 A | 5/2000 | Farris et al. | |
| 6,101,242 A | 8/2000 | McAllister et al. | |
| 6,122,357 A | 9/2000 | Farris et al. | |
| 6,195,422 B1 | 2/2001 | Jones et al. | |
| 6,246,751 B1 | 6/2001 | Bergl et al. | |
| 6,307,926 B1 | 10/2001 | Barton et al. | |
| 6,628,757 B1 | 9/2003 | Cannon et al. | |
| 6,636,591 B1 | 10/2003 | Swope et al. | |
| 6,639,977 B1 | 10/2003 | Swope et al. | |
| 6,639,978 B2 | 10/2003 | Drainzin et al. | |
| 6,647,096 B1 | 11/2003 | Milliorn et al. | |
| 6,665,376 B1 | 12/2003 | Brown | |
| 6,665,380 B1 | 12/2003 | Cree et al. | |
| 6,687,364 B1 | 2/2004 | Lehtinen | |
| 6,704,405 B1 | 3/2004 | Farris et al. | |
| 6,819,219 B1 | 11/2004 | Bolle et al. | |
| 6,829,332 B2 | 12/2004 | Farris et al. | |
| 6,836,540 B2 | 12/2004 | Falcone et al. | |
| 7,042,992 B1 | 5/2006 | Falcone et al. | |
| 7,058,163 B1 | 6/2006 | Parekh et al. | |
| 7,075,919 B1 | 7/2006 | Wendt et al. | |
| 7,079,636 B1 | 7/2006 | McNitt et al. | |
| 7,079,637 B1 | 7/2006 | McNitt et al. | |
| 7,102,509 B1 * | 9/2006 | Anders et al. | 340/539.13 |
| 7,106,843 B1 | 9/2006 | Gainsboro et al. | |
| 7,203,301 B1 | 4/2007 | Mudd et al. | |
| 7,333,798 B2 | 2/2008 | Hodge | |
| 2003/0002639 A1 | 1/2003 | Huie | |
| 2003/0099337 A1 | 5/2003 | Lord | |
| 2003/0163710 A1 | 8/2003 | Ortiz et al. | |
| 2004/0029564 A1 | 2/2004 | Hodge | |
| 2004/0073430 A1 * | 4/2004 | Desai et al. | 704/270.1 |
| 2004/0215968 A1 | 10/2004 | Rodwell et al. | |
| 2005/0043014 A1 | 2/2005 | Hodge | |
| 2005/0090232 A1 | 4/2005 | Hsu | |
| 2005/0097131 A1 | 5/2005 | Benco | |
| 2005/0138391 A1 | 6/2005 | Mandalia et al. | |
| 2006/0285650 A1 * | 12/2006 | Hodge | 379/32.01 |
| 2006/0285659 A1 * | 12/2006 | Suryanarayana et al. | 379/88.02 |
| 2007/0027807 A1 | 2/2007 | Bronstein | |
| 2007/0041545 A1 | 2/2007 | Gainsboro | |
| 2007/0061590 A1 | 3/2007 | Boye et al. | |
| 2007/0121882 A1 | 5/2007 | Timmins et al. | |
| 2007/0242658 A1 * | 10/2007 | Rae et al. | 370/352 |

OTHER PUBLICATIONS

U.S. Appl. No. 10/642,532, filed Aug. 15, 2003.
U.S. Appl. No. 10/646,638, filed Aug. 22, 2003.
U.S. Appl. No. 10/984,726, filed Nov. 9, 2004.
U.S. Appl. No. 11/403,547, filed Apr. 13, 2006.
U.S. Appl. No. 11/480,258, filed Jun. 30, 2006.
U.S. Appl. No. 11/603,958, filed Nov. 22, 2006.
WIPO, International Preliminary Report on Patentability, PCT/US2007/085096, May 26, 2009, Geneva, Switzerland.
USPTO, International Search Report, PCT/US2007/085096, May 16, 2008, Alexandria, Virginia.
USPTO, Written Opinion of the International Searching Authority, PCT/US2007/085096, May 16, 2008, Alexandria, Virginia.

* cited by examiner

SYSTEMS AND METHODS FOR DETECTING A CALL ANOMALY USING BIOMETRIC IDENTIFICATION

CROSS-REFERENCE TO RELATED APPLICATIONS

This application is related to concurrently filed and commonly assigned U.S. patent application Ser. No. 11/603,938 titled "SYSTEM AND METHOD FOR MULTI-CHANNEL RECORDING", co-pending U.S. patent application Ser. No. 11/480,258 titled "SYSTEMS AND METHODS FOR IDENTITY VERIFICATION USING CONTINUOUS BIOMETRIC MONITORING", Ser. No. 10/135,878 filed Apr. 29, 2002, titled "INFORMATION MANAGEMENT SYSTEM AND METHOD", Ser. No. 10/646,638 filed Aug. 22, 2003, titled "SYSTEM AND METHOD FOR CALL REDIRECT DETECTION AND TREATMENT", Ser. No. 10/252,956 filed Sep. 20, 2002, titled "THREE-WAY TELEPHONE CALL PREVENTION SYSTEM AND METHOD", Ser. No. 10/420,585 filed Apr. 22, 2003, titled "THREE WAY CALL DETECTION", Ser. No. 10/642,532 filed Aug. 15, 2003, titled "CENTRALIZED CALL PROCESSING", Ser. No. 10/984,726 filed Nov. 9, 2004, titled "SYSTEM AND METHODS FOR PROVIDING TRANSACTION CONTROL NETWORK WITHIN AND OUTSIDE A CONTROLLED ACCESS FACILITY", Ser. No. 11/403,547 filed Apr. 13, 2006, titled "UNAUTHORIZED CALL ACTIVITY DETECTION AND PREVENTION SYSTEMS AND METHODS FOR A VOICE OVER INTERNET PROTOCOL ENVIRONMENT", and U.S. Pat. No. 5,768,355, titled "THREE-WAY CALL DETECTION SYSTEM", the disclosures of which are hereby incorporated herein by reference.

TECHNICAL FIELD

The following description relates generally to call processing systems and methods, and more particularly to systems and methods for detecting an anomaly on a call, such as a change in the parties to the call, based at least in part on biometric identification, such as voice printing.

BACKGROUND OF THE INVENTION

In many environments, monitoring of telephony calls to detect and/or prevent unauthorized activities is desirable. For example, private premise-based telephone systems, such as those installed at correctional facilities or other controlled-environment facilities, generally desire to monitor various events occurring on the telephone lines of the system. Telephone systems at correctional facilities or other controlled-environment facilities may comprise a microprocessor-based call processing system having operational software that is capable of allowing control over telephones connected to the system. For example, the system may be programmed to prevent residents (e.g., inmates of a correctional facility) from contacting unauthorized parties or using the telephone system for fraudulent purposes. An authorization mechanism may be utilized to prevent residents from dialing unauthorized numbers directly. For instance, in a correctional facility, such as a prison, a call processing system may be employed for preventing an inmate from calling certain unauthorized parties as judges, a victim of the inmate's crime and/or family members of the victim, and known crime associates of the inmate, as examples.

Additionally, a call processing system my prevent a resident from initiating a three-way call, taking part in a conference call, or the like. However, a particular problem that is encountered in these systems is the placement of a three-way call, or the like, by a party that is authorized to be called by the resident. Once the resident is connected to an authorized number, the resident may be connected to a third party at an unauthorized number via the three-way call feature by a party at the authorized number. Care may be taken to insure that a resident does not call an unauthorized party. However, once a call is connected through the Public Switched Telephone Network (PSTN) it becomes very difficult to control the actions of the called party. Therefore, to preserve this screening activity, it is often desirable to insure that the called party is in fact the person to whom the call is terminating. Therefore, it is often desirable to have control of the call with respect to all the parties who are on the phone call. In short, it is desirable to prevent addition of an unknown third party to a resident call in order to preserve the integrity of the initial call screening.

A three-way call may be initiated when the originally called party (e.g. an authorized party outside the private telephone system) depresses the hook switch on the telephone, generating a hook flash signal. This signals the telephone central office to put the resident on hold and provide a dial tone to the originally called party. On receipt of the dial tone, the originally-called party dials the number of an unauthorized third party, and when the connection is completed, the resident and the unauthorized third party can communicate through the connection established outside the private system.

Three-way call monitoring systems which have been developed to prevent unauthorized calls according to the foregoing scenario rely on the detection of telephone signals. They typically monitor the local telephone connection for the hook flash "click" signal or associated central office signals that fall in a frequency band outside the range of frequencies produced by the human voice. These systems typically monitor signals on the local telephone line through a frequency filter designed to pass audio signals in this frequency band. A three-way call attempt may be indicated whenever signals in the frequency band have energies above a selected threshold. Some systems compare the signals with a hook flash reference signal utilizing sampling techniques implemented with a digital signal processor (DSP).

Even in a more or less conventional telephone environment these systems may not be very accurate for a number of reasons. The underlying assumptions about the frequency profile of three-way call events, i.e. the hook flash and signals generated by activating central office switches, are often wrong. For example, the hook flash signals are often modified by transmission through switches and along loaded lines, and even if assumptions about the frequency characteristics of the initial signal are accurate, these characteristics may be substantially distorted by the time the "hook flash" signal reaches a call processing system implementing three-way call detection, or the like.

Other systems and methods for detecting undesired call activity are disclosed in Salibrici, U.S. Pat. No. 5,768,355 and above-incorporated commonly owned, co-pending U.S. patent application Ser. No. 10/252,956, filed Sep. 20, 2002 and titled THREE-WAY TELEPHONE CALL PREVENTION SYSTEM AND METHOD. Salibrici teaches using digital signal processing to identify a third-party connection. Salibrici operates by establishing a baseline ambient, or background, noise level, and detecting when the signal noise level drops below the ambient noise level. When the current signal noise level drops below the ambient noise level, the system assumes that a three-way conference call has been attempted by the called party. U.S. patent application Ser. No. 10/252,956 discloses an exemplary technique for detecting three-way calls, which in general includes detecting a call signal level, determining if the call signal level is below a predetermined silence level threshold, and measuring a duration the call signal level remains below the predetermined silence level threshold.

Certain calls may have their audio carried over at least a portion of a communication network as packets. For example, Voice over IP ("VoIP") is one example in which at least a portion of a call's is carried as packets over a communication network. Internet protocol ("IP") is a routing protocol designed to route traffic within a network or between networks. VoIP is a known method for providing voice capabilities over an IP network, such as the Internet or an intranet. In such networks data packets are sent to and from communication sites to facilitate communication. In communication systems utilizing a VoIP protocol, the packets are commonly referred to as datagrams. In typical VoIP networks, each communication site sends datagrams to other communication sites with which they are in communication. There are different approaches to sending datagrams. Control signals per ITU recommendation H.323, and audio-based media streams using Real-Time Transport Protocol (RTP) per Internet RFC 1889, may be applied. Alternatively, control signals could be applied using other protocols such as Session Initiation Protocol (SIP) per Internet RFC 2543.

Potentially even more difficult to detect than a three-way call is a handoff of a call from an authorized party to an unauthorized party. For instance, a resident may call an authorized party's number and the authorized party may even initially answer the call; however, after the call is authorized by the call processing system (e.g., after the system verifies that the resident is authorized to speak with the called party), the called party may, during the course of the ongoing call, hand off the telephone to another party (or place the call on speaker phone so that another party can participate in the call). Similarly, after a call is authorized and connected for the resident, the resident may hand off the call to another resident who is not authorized to participate on the call. In this manner, a called party and/or a resident may facilitate an unauthorized party to participate on a call after the call is initially authorized for the resident and called party. With such a handoff, no indication of the handoff is available in the call's signaling, as with the hook flash signal that may be used in traditional PSTN calls for detecting three-way calling attempts.

In view of the above, a desire exists for monitoring calls for detecting and/or preventing unauthorized activity during the calls, such as detecting a call to an unauthorized party, detecting an unauthorized three-way call, etc. As mentioned above, detecting certain unauthorized activity, such as an unauthorized three-way call, is particularly problematic when the call is carried via packets, as in VoIP.

Also known in the art is the use of various biometric data for identifying individuals (e.g., for investigative purposes, for restricting access to particular areas of a building, etc.). For instance, fingerprinting technology is well-known for identifying, with some degree of confidence, an individual based on a fingerprint. Indeed, an individual may be identified with a high-level of confidence based only on a partial fingerprint, if a sufficient number of characteristic points are available on the partial fingerprint. Various other biometric identification of humans that are known in the art include face recognition, voice recognition, iris scanning, retina imaging, and handwriting analysis. Various computer-executable processes for performing such biometric identification are known in the art.

Certain voice recognition techniques have been proposed for identifying parties to a telephony call. As one example, U.S. Pat. No. 6,246,751 ("the '751 patent") issued Jun. 12, 2001 describes a technique for identifying a caller to prevent unauthorized call forwarding. In the '751 patent, speech is captured from a caller attempting to place a call, and the speech is used to identify the caller to detect and prevent fraudulent use of call forwarding.

As another example, U.S. Pat. No. 5,170,426 ("the '426 patent") issued Dec. 8, 1992 discloses a method and system for home incarceration. According to the '426 patent, monitoring and verification is performed through a telephone network including a telephone on the premises of the location of confinement and a control center. Voice verification, using voice analysis of speech transmitted in a telephone call from the site to the center is performed. A voice template vocabulary is established for the individual and used for voice verification. Caller line identification of each incoming call is performed to verify that call originates from the appropriate location. The confined individual is required, either randomly or at scheduled intervals, to call the control center and recite a statement including randomly selected words from the template vocabulary. This enables the system to verify that the caller is indeed the confined person and is calling from an appropriate location to which he is to be confined.

Similarly, U.S. Pat. No. 6,101,242 ("the '242 patent") discloses method and system for home incarceration. According to the '242 patent, voice identification is used to identify a caller and an answering party. A corresponding profile of one or more of the identified parties may then be used for the call. The profile may specify, for example, particular keywords to be detected during the call, a particular billing arrangement to be imposed for the call, etc.

As yet another example, U.S. Pat. No. 4,843,377 ("the '377 patent") discloses an arrangement for home incarceration which proposes the use of a voiceprint as a means for remote prisoner identification. In the '377 patent, audio spectral analysis is performed and applied to speech transmitted over a telephone line to determine a match with a probationer's voiceprint.

BRIEF SUMMARY OF THE INVENTION

Embodiments of the present invention are directed generally to use of biometric identification during a call for detecting an anomaly occurring in the call, such as a change in the parties participating on the call. In accordance with embodiments of the present invention, communication between parties of a call is monitored and biometric identification is performed using the communication. According to one exemplary embodiment, voice prints are obtained for parties that are authorized to participate on a call. The call is then monitored and audio captured during the call is compared with the voice prints to detect changes in the parties participating on the call, such as a new, unauthorized party joining the call. In another exemplary embodiment, face prints are obtained for parties that are authorized to participate on a call. The call is then monitored and video communication of the call (e.g., of a video conference call) is used for comparison with the face prints to detect changes in the parties participating on the call, such as a new, unauthorized party joining the call. Thus, embodiments of the present invention advantageously enable a call processing system to monitor calls and detect anomalies occurring during the calls, such as three-way calling, a handoff of a call from one party to another, etc.

Embodiments of the present invention have particular applicability within controlled-environment facilities for monitoring the calling activities between a resident and other parties. Examples of controlled-environment facilities include correctional facilities (e.g., municipal jails, county jails, state prisons, federal prisons, military stockades, juvenile facilities, detention camps, and home incarceration environments), healthcare facilities (e.g., hospitals, nursing homes, mental health facilities, and rehabilitation facilities, such as drug and alcohol rehabilitation facilities), restricted living quarters (e.g., hotels, resorts, camps, dormitories, and barracks), and the like. Certain controlled-environment facilities may be thought of as a small community or city, perhaps walled or otherwise access restricted, wherein various activities occur within the community and between the community and those outside the community in the daily operation thereof. Such a community may include a number of individuals and enterprises directly associated therewith, including management, staff, and inmates, residents, patients, or guests (herein referred to as "residents"), and a number of individuals and enterprises indirectly associated therewith, including friends and family of residents, vendors, government agencies, providers of services to residents, and individuals with a connection to the facility or its residents. Of course, as those of ordinary skill in the art will recognize, while embodiments the present invention have particular applicability to controlled-environment facilities (because such facilities often have a desire to monitor calling activity), the concepts disclosed herein may likewise be employed in other environments.

Embodiments of the present invention can be applied for monitoring various types of calls. As used herein, except where accompanying language expressly specifies otherwise, a "call" is intended to broadly refer to any communication between two or more parties from which biometric identification can be obtained. Thus, a "call" is not limited to telephony calls, but also encompasses various other types of communication. For instance, a video communication is a call, and biometric identification may be performed in certain embodiments using the video portion of the communication (e.g., using face recognition, iris recognition, and/or other video-based recognition techniques). Additionally, if a video communication further comprises an audio portion, the audio of such communication may likewise be used in addition to or instead of the video for biometric identification (e.g., voice recognition or other audio-based recognition techniques). As another example, a handwritten communication, such as a handwritten message input to a computer device, such as a personal digital assistant (PDA) or laptop computer, and communicated via a communication network may be analyzed using known handwriting analysis techniques for performing biometric identification of the writer. In certain embodiments of the present invention, the call being monitored is substantially a real-time communication between the parties (e.g., as in telephony calls), but application of the concepts presented herein are not limited to real-time communication.

According to one embodiment of the present invention, a method comprises determining a biometric print for a party on each authorized side of a call. As described further herein, the biometric print may comprise any type of biometric data associated with a party from which the party can be uniquely identified with a high degree of confidence. Generally, a biometric print comprises characteristic points of biometric data (e.g., characteristic points in a audio sample, etc.) that uniquely identifies the person to which the biometric data relates. A biometric print may comprise, as examples, a voice print, face print, iris print, retina print, handwriting print, and/or the like. In certain embodiments, the parties to a call may be prompted at the outset of the call to take some action to assist in the capture of biometric data from which the biometric print is determined. For instance, the parties may each be prompted to speak their names so that audio data can be obtained from which a voice print can be determined for each party.

The method further comprises capturing, from communication during the call, biometric information for the parties on each authorized side of the call. Thus, biometric information of the type corresponding to the biometric print may be captured from the communication between the parties during the ongoing call. For instance, a voice print may be obtained for each of the authorized parties to a call, and then audio of the communication between the parties during the ongoing call may be captured. The method of this exemplary embodiment further comprises monitoring the captured biometric information during the call to detect, based at least in part on the determined biometric prints, an anomaly in the call. For instance, audio captured during the call may be compared against the voice prints of the authorized parties to detect changes in the parties participating on the call, such as a new party joining the call.

According to another exemplary embodiment of the present invention, a system comprises biometric printing logic that is operable to generate a biometric print identifying parties on each side of a call. Again, the biometric print may comprise any type of biometric data associated with a party from which the party can be uniquely identified with a high degree of confidence. The biometric print may comprise, as examples, a voice print, face print, iris print, retina print, handwriting print, and/or the like. In certain embodiments, the biometric printing logic may, at the outset of a call, prompt the parties to the call to take some action to assist in the capture of biometric data from which the biometric print is determined. For instance, the parties may each be prompted to speak their names so that audio data can be obtained from which a voice print can be determined for each party. The system further comprises call monitoring logic that is operable to compare generated biometric prints for the parties of the call with biometric data captured from communication by parties participating during the call to detect a change in parties to the call. For instance, the call monitoring logic may compare audio captured during the call against voice prints of the authorized parties to detect changes in the parties participating on the call, such as a new party joining the call.

While in certain embodiments biometric prints are used for monitoring the parties participating on each side of a call, in other embodiments biometric prints may be used for monitoring parties participating only on a side of interest. For instance, a resident of a controlled-environment facility may be required to make a call from a room in which no other resident is present so that the resident is unable to handoff the call to another resident after the call is authorized/connected. Further, the telephony services provided to the controlled-environment facility may, in some way, prevent the resident from initiating a three-way call. Thus, the controlled-environment facility may implement its calling services in a manner that effectively prevents a party joining an ongoing call on the resident's side of the call. However, the biometric identification techniques described herein may be applied to a party outside the controlled-environment facility to whom the resident calls. That is, because the controlled-environment facility has little control over the outside party, the outside party may attempt to initiate a three-way call or handoff the call to an unauthorized party, etc. Thus, the biometric identification techniques described herein may be applied to only select sides of a call, such as only to the outside party's side of the call in the above example.

As described further herein, the monitoring of communication may include not only monitoring of communication by parties participating directly on the call, but may also include monitoring of background communication. For instance, in monitoring an audible telephony call, a call processing system according to an embodiment of the present invention may monitor background audio on each side of the call. The background audio may be monitored to, for example, detect other parties in the vicinity of a party participating on the call.

As also described further herein, certain embodiments break a call into multiple channels. For instance, a separate channel may be used for each side of the call. Thus, in an audible telephony call, a call processing system according to an embodiment of the present invention may monitor audio on each respective channel of the call. In this manner, audio regarding parties participating on the call and/or background audio can be determined with regard to the side of the call on which such audio occurs. Further, in certain embodiments, a control channel is used to correlate the multiple channels together (e.g., in a temporal manner).

Certain embodiments of the present invention further comprise storing the biometric identification data determined for parties to a call. For instance, once a biometric print is determined for a party, it may be stored to a computer-readable medium and associated with the respective party to which it relates. In this manner, the biometric print may be re-used for monitoring of future calls involving the respective party in certain embodiments. Further, if an unauthorized party participates during a monitored call, the unauthorized party's biometric data (e.g., audio of the unauthorized party's voice) may be compared against stored biometric prints (e.g., stored voice prints) in attempt to identify such unauthorized party. Additionally, a record of a given call may be stored to a computer-readable medium, which may comprise the corresponding biometric identification determined during monitoring of the call. Thus, biometric identification determined during a given monitored call may be stored to a computer-readable medium in a manner such that it is associated with the corresponding monitored call. Thus, if an investigator desires to later retrieve the call record and review the parties participating on the call, including the biometric identification performed during the call, he can do so via the call's stored record. In certain embodiments, the call is broken into multiple channels, as mentioned above, and the multiple channels, along with the control channel, may be stored in the call record. Thus, each channel (e.g., each side of the call) may be later reviewed individually from the call record, if so desired.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Embodiments of the present invention provide call processing systems and methods which make use of biometric identification during a call for detecting an anomaly occurring in the call, such as a change in the parties participating on the call. In accordance with embodiments of the present invention, communication between parties of a call is monitored and biometric identification is performed using the communication. That is, the communication between the parties may be monitored to capture information from which biometric identification of the parties can be performed.

According to one exemplary embodiment, voice prints are obtained for parties that are authorized to participate on a call. The call is then monitored and audio captured during the call is compared with the voice prints of the authorized parties to detect changes in the parties participating on the call, such as a new, unauthorized party joining the call. In another exemplary embodiment, face prints are obtained for parties that are authorized to participate on a call. The call is then monitored and video communication of the call (e.g., of a video conference call) is used for comparison with the face prints of the authorized parties to detect changes in the parties participating on the call, such as a new, unauthorized party joining the call. Thus, embodiments of the present invention advantageously enable a call processing system to monitor calls and detect anomalies occurring during the calls, such as three-way calling, a handoff of a call from one party to another, etc.

As mentioned above, various biometric identification techniques are known in the art. Also, voice recognition has been proposed for identifying a caller and/or called party, as in the '751 patent, the '426 patent, the '242 patent, and the '377 patent mentioned above. However, among other things, none of these prior art patents propose monitoring audio of an ongoing call to detect such anomalies during the call as a new party joining the call or the parties to the call otherwise changing. That is, prior techniques have failed to use determined voice prints (or other biometric data) for comparison with audio (or other biometric data) captured during an ongoing call to detect changes in the parties participating on the call. Further, none of the above-identified prior art patents propose monitoring audio of an ongoing call to detect information from the background audio of the call, such as other parties in the vicinity of a party participating on the call, etc.

Figure 1:
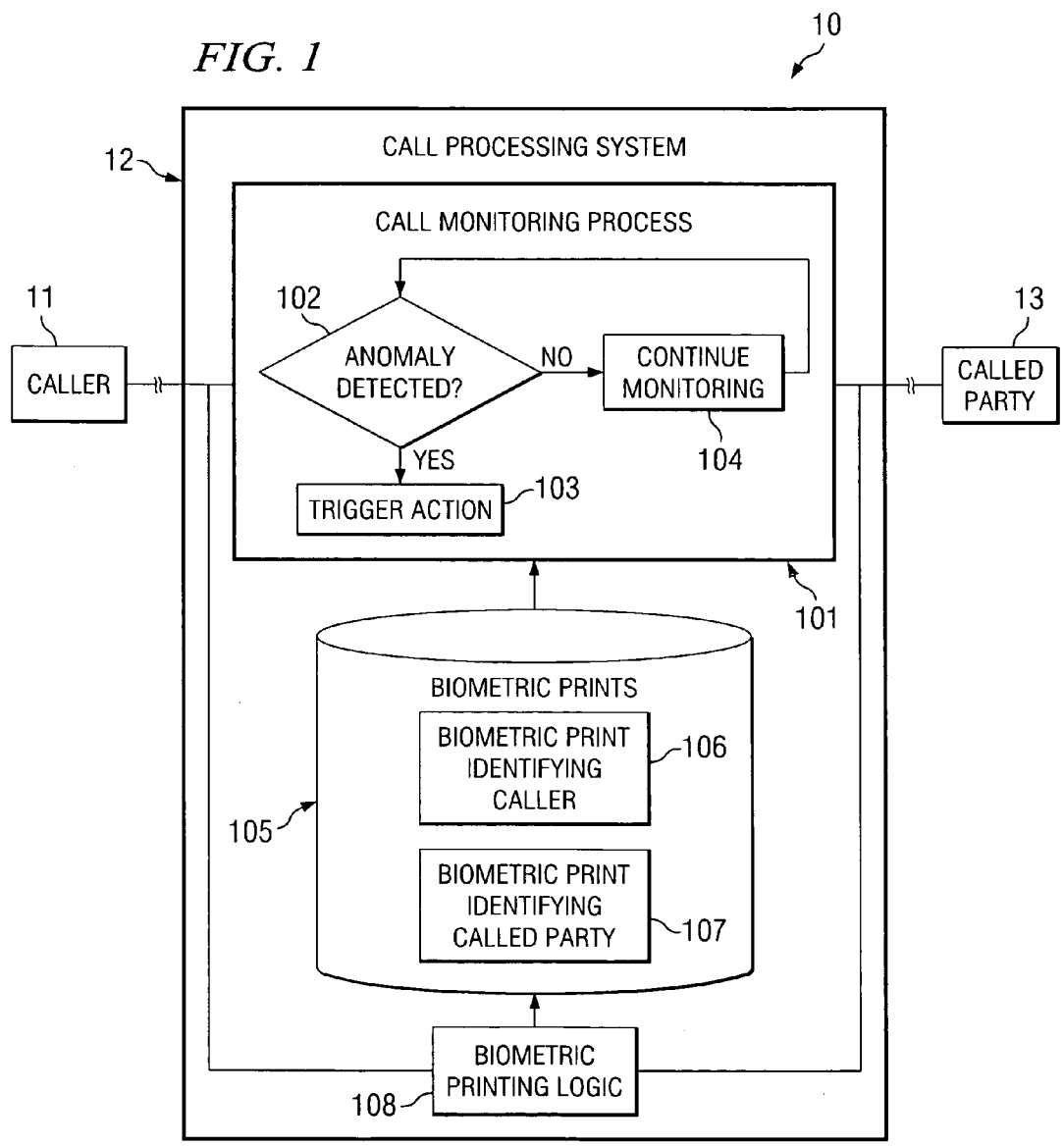
FIG. 1 shows an exemplary system employing an embodiment of the present invention.

Turning to FIG. 1, an exemplary system 10 employing an embodiment of the present invention is shown. In exemplary system 10, a caller 11 makes a call to called party 13. Such a call may be a telephone call, video conference call, or other communication conducted over a communication network, such as a circuit-switched or packet-switched network as examples. For example, the communication between the parties may be communication over any suitable communication network now known or later developed that supports communication between parties, such as a public-switched telephony network (PSTN), wireless network, the Internet or other wide-area network (WAN), a local-area network (LAN), or any combination of the foregoing, as examples. A call processing system 12 is provided for monitoring the call. In this example, call processing system 12 comprises biometric printing logic 108 that is operable to generate biometric prints 106 and 107 for caller 11 and called party 13, respectively. As shown, such biometric prints may be stored to a computer-readable data storage medium 105, which may comprise a database, file, or other data structure stored to hard disk, random access memory (RAM), optical disk, magnetic disk, or other computer-readable data storage medium now known or later developed.

Call processing system 12 further comprises a call monitoring process 101 that, as discussed further herein, is operable to monitor communication between caller 11 and called party 13, and based at least in part on the biometric prints detect anomalies occurring in the call, such as a change in the parties participating in the call. Thus, as shown in the example of FIG. 1, call monitoring process 101 may monitor communications between caller 11 and called party 13 and determine in operational block 102, based on a comparison between the biometric prints 106, 107 and biometric data determined from the communications, whether an anomaly is detected for the call. If determined that an anomaly is detected, such as a change in the parties participating in the call, then a responsive action may be triggered in block 103, such as notifying appropriate personnel, recording the communication (e.g., for future investigative purposes), and/or terminating the call, as examples. While no anomaly is detected, operation advances to block 104 to continue monitoring of the communications between caller 11 and called party 13.

Biometric printing logic 108 may be any suitable logic (e.g., hardware and/or software) for generating any of various different types of biometric prints. In general, a biometric print refers to a biometric characteristic of an individual from which that individual can be uniquely identified, to a high-degree of confidence. Various types of biometric prints that are capable of such identification are known, such as voice prints, fingerprints, face prints, iris prints, retina prints, and handwriting prints, as examples. In one embodiment, biometric printing logic 108 is operable to generate voice prints that can be used to identify a party based on the party's voice. In another embodiment, biometric printing logic 108 is operable to generate face prints that can be used to identify a party based on an image of the party's face. Of course, in other embodiments, biometric printing logic 108 is operable to generate some other biometric print that identifies a party, such as an iris print, retina print, or handwriting print.

Preferably, the type of biometric print generated by biometric printing logic 108 is a type that can be generated from the monitored communications. For instance, in an embodiment in which caller 11 and called party 13 are to audibly communicate with each other (e.g., via voice telephony call), then biometric printing logic 108 may generate audio-based biometric prints, such as voice prints. Thereafter, the audible communications between caller 11 and called party 13 may be monitored and compared with the generated audio-based biometric prints to, for example, detect changes in the parties participating on the call.

As another example, in an embodiment in which the communication between caller 11 and called party 13 comprises video of the parties (e.g., via video conference call), then biometric printing logic 108 may generate video-based biometric prints, such as face prints, iris prints, etc. Thereafter, the video communications between caller 11 and called party 13 may be monitored and compared with the generated video-based biometric prints to, for example, detect changes in the parties participating on the call.

As another example, in certain embodiments the communication between caller 11 and called party 13 comprises handwritten communication. For instance, various computer devices, such as tablet PCs, are available that accept handwritten input, such as a pad that enables a user to provide handwritten input using a stylus. Such handwritten messages may then be communicated, e.g. via a packet-switched network, between a called party 13 and a caller 11. In such case, biometric printing logic 108 may generate handwriting-based biometric prints, such as a handwriting print for use in recognizing an individual's handwriting. Thereafter, the handwritten communications between caller 11 and called party 13 may be monitored and compared with the generated handwriting-based biometric prints to, for example, detect changes in the parties participating on the call.

In certain embodiments, biometric printing logic 108 captures communication from the caller 11 and called party 13 at the outset of the call and generates the corresponding biometric prints for the parties. For instance, biometric printing logic 108 may, at the outset of the call, prompt (e.g., using an interactive voice response (IVR) unit) to provide a sample communication which biometric printing logic 108 uses to generate biometric prints 106 and 107. For example, when caller 11 initially attempts to place the call, biometric printing logic 108 may interrupt the call and prompt the caller to speak his/her name, and biometric printing logic 108 may use the audible response from the caller to generate a voice print for the caller. Similarly, when called party 13 initially answers the call, biometric printing logic 108 may interrupt the call and prompt the called party to speak his/her name, and biometric printing logic 108 may use the audible response from the called party to generate a voice print for the called party.

While in the illustrated example of FIG. 1, biometric printing logic 108 is shown as capturing communication from the caller 11 and called party 13 and generating the respective biometric prints for the parties therefrom, in other embodiments the biometric prints may be generated in a different fashion. For instance, in certain embodiments, a biometric print may have been previously generated for caller 11 and/or called party 13, and then used by call monitoring process 101 for monitoring a call between such caller 11 and called party 13. For instance, a voice print may have been generated for caller 11 and/or called party 13 during a previous call, and such voice print may be stored to a computer-readable storage medium and associated with the respective party which it identifies. For instance, a voice print previously generated for caller 11 may be associated with a personal identification number (PIN) that the caller is required to input when initiating a call. Thus, call processing system may receive the PIN and look-up the previously generated voice print for the caller. Similarly, a voice print previously generated for called party 13 may be associated with the called party's telephone number. Thus, call processing system may receive the telephone number being called by caller 11 and use such number to look-up the previously generated voice print for the called party.

As another example, caller 11 may be a resident of a controlled-environment facility, and the caller may provide a sample communication (either knowingly or unknowingly) that is used by biometric printing logic 108 for generating a biometric print for the caller 11 before the caller 11 attempts to place the call illustrated in FIG. 1. For instance, upon being processed for becoming a resident of the controlled-environment facility, the resident may be required to speak, and the resident's voice may (either known or not known to the resident) be recorded and/or used to generate a voice print for the resident. Again, such voice print may be stored in a manner such that it is linked with the corresponding resident (e.g., stored to a database and indexed by the resident's respective PIN, etc.).

Figure 2:
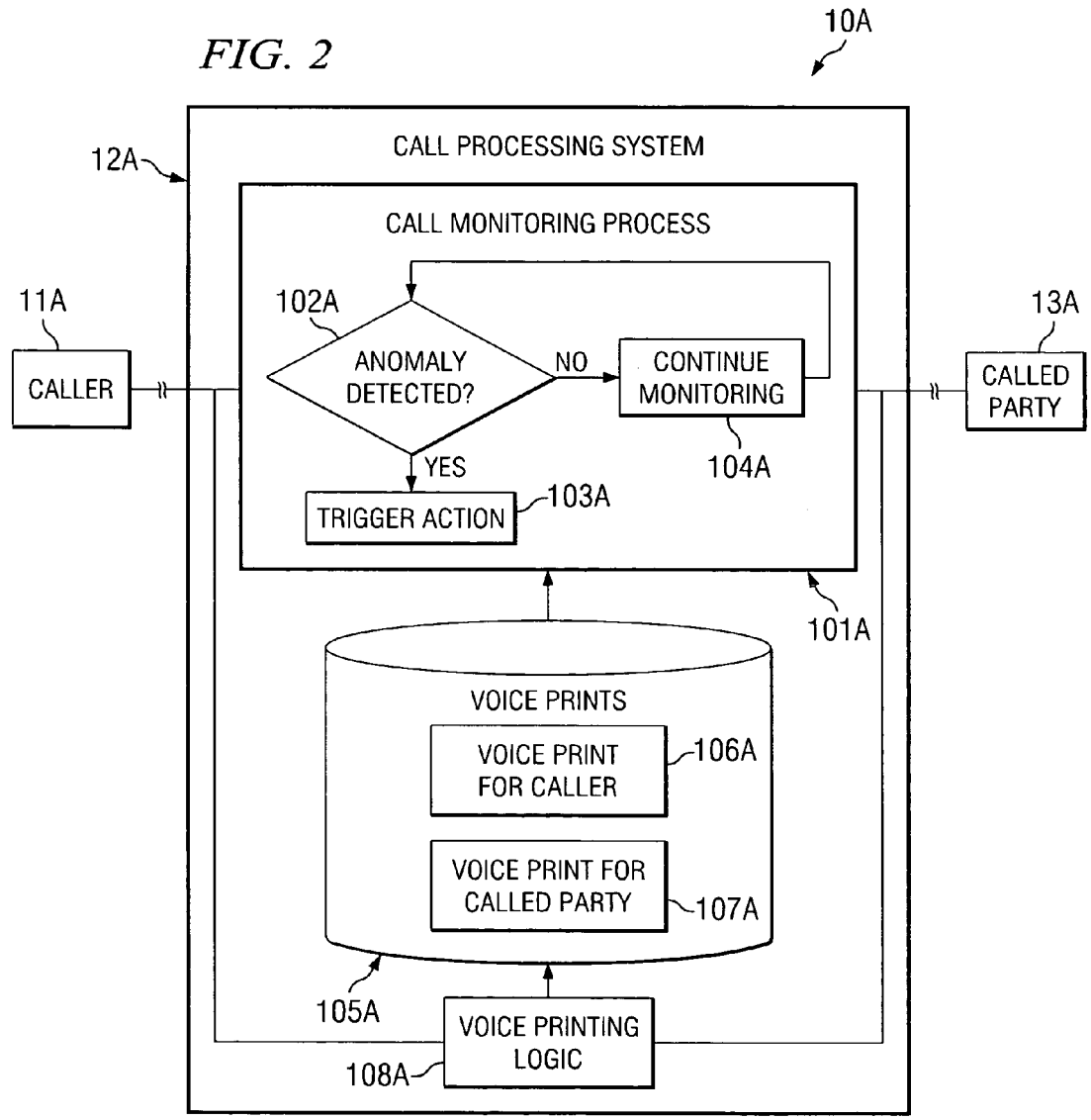
FIG. 2 shows another exemplary embodiment of a system employing an embodiment of the present invention, wherein parties audibly communicate on a call and voice prints are used to perform biometric identification of parties participating on the call.

FIG. 2 shows an exemplary embodiment in which the parties audibly communicate and the biometric prints comprise voice prints. As shown, in an exemplary system 10A employing an embodiment of the present invention, a caller 11A makes a call to called party 13A. In this example, such a call is a telephone call, video conference call, or other communication conducted over a communication network in which the parties are to audibly communicate. A call processing system 12A is provided for monitoring the call. In this example, call processing system 12A comprises voice printing logic 108A that is operable to generate voice prints 106A and 107A for caller 11A and called party 13A, respectively. As shown, such voice prints may be stored to a computer-readable data storage medium 105A, as with computer-readable data storage medium 105 of FIG. 1.

Call processing system 12A further comprises a call monitoring process 101A that, as discussed further herein, is operable to monitor the audible communication between caller 11A and called party 13A, and based at least in part on the voice prints detect anomalies occurring in the call, such as a change in the parties participating in the call. Thus, as shown in the example of FIG. 2, call monitoring process 101A may monitor audible communications between caller 11A and called party 13A and determine in operational block 102A, based on a comparison between the voice prints 106A, 107A and audio data captured from the communications, whether an anomaly is detected for the call. If determined that an anomaly is detected, such as a change in the parties participating in the call, then a responsive action may be triggered in block 103A, such as notifying appropriate personnel, recording the communication (e.g., for future investigative purposes), and/or terminating the call, as examples. While no anomaly is detected, operation advances to block 104A to continue monitoring of the audible communications between caller 11A and called party 13A.

Figure 3:
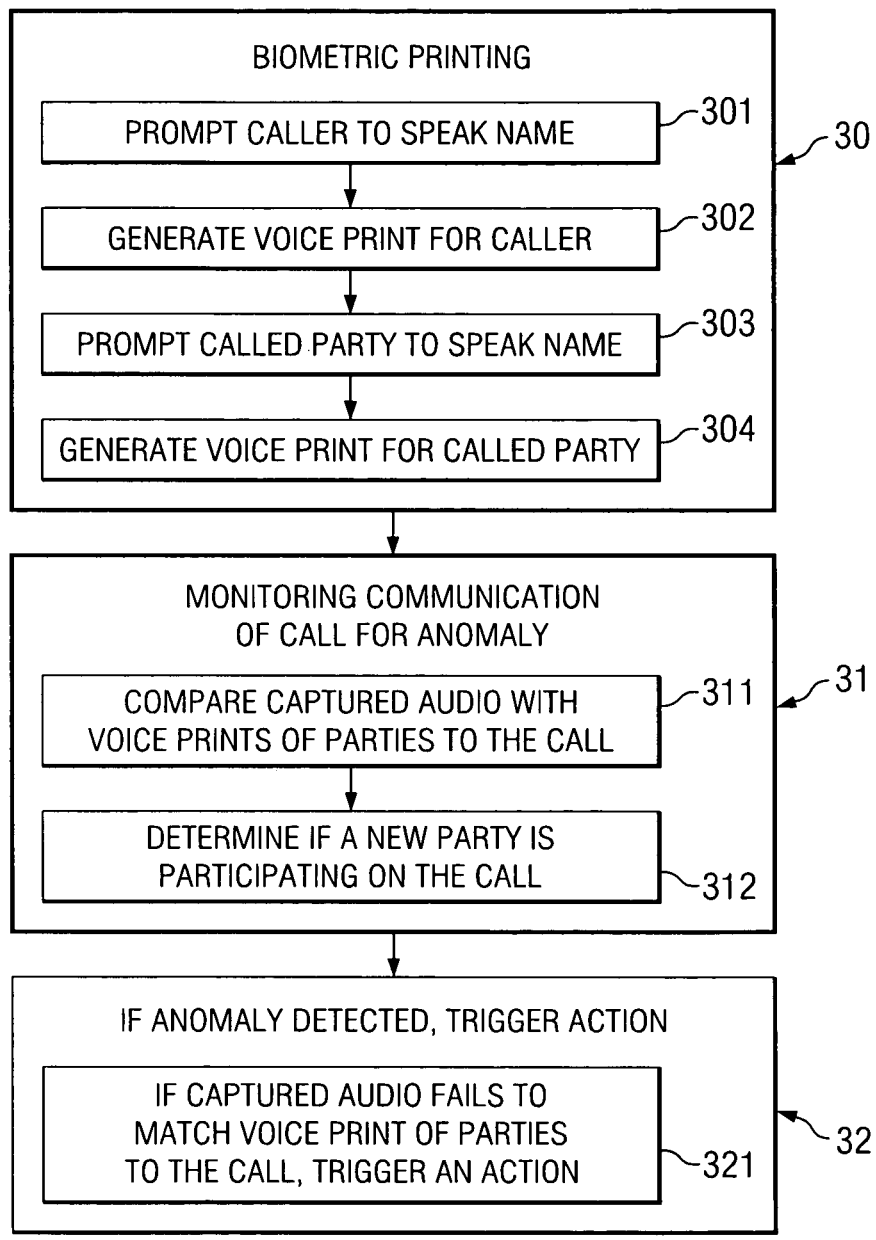
FIG. 3 shows an operational flow according to one embodiment of the present invention.

Turning to FIG. 3, an operational flow according to one embodiment of the present invention is shown. In operational block 30, biometric printing is performed to generate biometric prints identifying authorized parties to a call. An example of such biometric printing that may be performed in one embodiment is shown in blocks 301-304. In block 301, upon attempting to place a call, a caller is prompted (e.g., by an IVR unit) to speak his/her name. In block 302, voice printing logic (e.g., logic 108A of FIG. 2) receives the spoken response from the caller and uses such response to generate a voice print for the caller. In block 303, upon a called party answering the call, the called party is prompted (e.g., by an IVR unit) to speak his/her name. In block 304, voice printing logic (e.g., logic 108A of FIG. 2) receives the spoken response from the called party and uses such response to generate a voice print for the called party.

In block 31, a call processing system monitors communication of the call for an anomaly, such as parties participating on the call changing. Such monitoring may be passively performed (with or without knowledge of such monitoring by the participants on the call) by a monitoring process, such as process 101 of FIG. 1 or process 101A of FIG. 2. An example of such monitoring that may be performed in one embodiment is shown in blocks 311-312 of FIG. 3. In block 311, captured audio from the communication during the call is compared with voice prints of the authorized parties to the call. In block 312, the monitoring process determines if a new party is participating on the call. Such determination may be made, for example, by detecting a speaker's voice that does not sufficiently match one of the voice prints of the authorized parties to the call (e.g., does not match the voice print of the caller or the called party).

In block 31, if an anomaly is detected, such as a change in the parties participating on the call, then the monitoring process may trigger a responsive action, such as notifying appropriate personnel, recording the communication (e.g., for future investigative purposes), and/or terminating the call, as examples. An example of such operation according to one embodiment is shown in operational block 321, in which if captured audio from a call fails to match a voice print of authorized parties to the call, then a responsive action is triggered.

Figure 4:
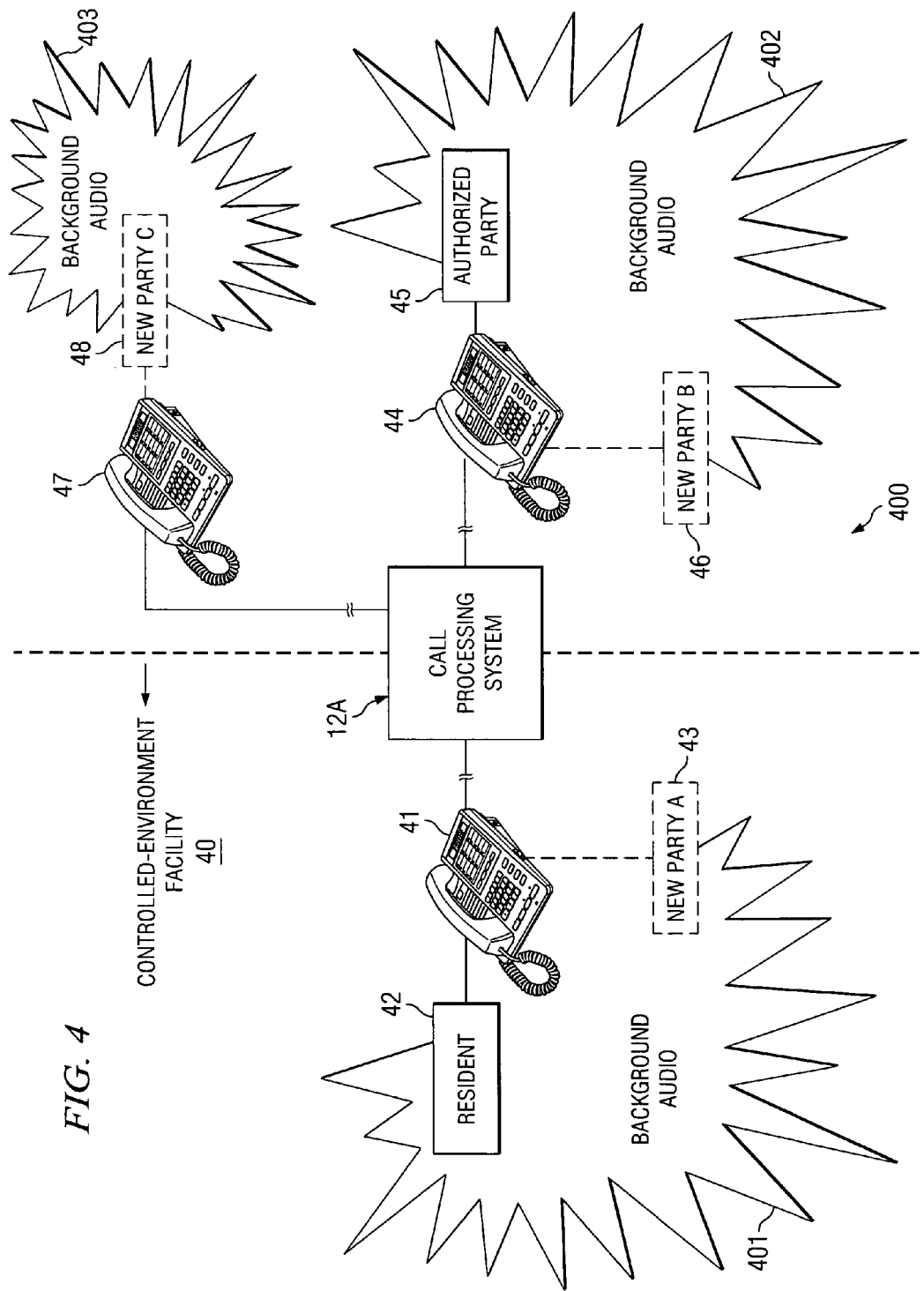
FIG. 4 shows an exemplary system employing an embodiment of the present invention, wherein a call processing system is used to monitor audible communications of calls for a controlled-environment facility, such as a correctional facility.

Turning to FIG. 4, an exemplary system 400 employing an embodiment of the present invention is shown. In exemplary system 400, a call processing system 12A is used to monitor audible communications of calls for a controlled-environment facility 40, such as a correctional facility. Call processing system 12A may be implemented within the controlled-environment facility 40, or it may be implemented external thereto. For instance, in certain embodiments, call processing system 12A may be implemented in a central server that monitors calls for one or more controlled-environment facilities. Further, in certain embodiments, various parts of the call processing system 12A may be implemented in a distributed fashion.

In the exemplary system 400, resident 42 of controlled-environment facility 40 uses telephone 41 to call an authorized party 45. Authorized party 45 can accept the call and audibly communicate with resident 42 via telephone 44. Call processing system 12A may use various techniques for determining that the called party 45 is authorized to participate in the call. For instance, the called number may be initially be compared against a "do not call" list of telephone numbers for the resident to ensure that the number being called is not a known number that the resident is restricted from calling, such as the number of a judge, the number of a victim of a crime committed by the resident, etc. Once determined that the call is authorized, then as described above with FIG. 2, call processing system 12A captures audio of the communication and compares the audio to voice prints of the resident 42 and authorized party 45 to detect anomalies, such as a change in the parties participating on the call.

If, during the call, resident 42 hands telephone 41 off to a new party A 43, call processing system 12A can detect participation in the call by new party A 43 by comparing the audio communication of the call that includes audible speech from new party A 43 with the voice prints of resident 42 and authorized party 45 and determining that the audio does not match either of the prints, thus indicating participation by a new party. Similarly, if during the call authorized party 45 hands telephone 44 off to a new party B 46, call processing system 12A can detect participation in the call by new party B 46 by comparing the audio that includes audible speech from new party B 46 with the voice prints of resident 42 and authorized party 45 and determining that the audio does not match either of the prints, thus indicating participation by a new party.

Further, call processing system 12A can detect participation by a new party that is connected to the call via three-way calling. For instance, if during the call authorized party 45 places a three-way call to new party C 48, thus enabling new party C 48 to audibly communicate via telephone 47 with authorized party 45 and resident 42, call processing system 12A can detect participation in the call by new party C 48 by comparing the audio that includes audible speech from new party C 48 with the voice prints of resident 42 and authorized party 45 and determining that the audio does not match either of the prints, thus indicating participation by a new party.

The audio of the call may contain not only voices of parties participating on the call, but may also include background audio. For instance, the call may include not only voices of resident 42 and authorized party 45, but may also include background audio 401 on the resident 42's side of the call and background audio 402 on the authorized party 45's side of the call. Additionally, if new party C 48 is connected to the call, the captured audio may include not only voice of new party C 48 but also background audio 403 for the new party C 48's side of the call.

Thus, the monitoring of communication may include not only monitoring of communication by parties participating directly on the call, but may also include monitoring of background communication. For instance, in monitoring an audible telephony call, a call processing system according to an embodiment of the present invention may monitor background audio on each side of the call. The background audio may be monitored to, for example, detect other parties in the vicinity of a party participating on the call. For instance, a party audibly "feeding" information or instructions to a party participating directly on the call may be detected in the background audio. In certain embodiments, voices in the background may be compared with stored voice prints to determine the identity of parties in the vicinity of a party participating on the call, which may be of use in an investigation and/or in determining associations between various individuals.

In certain embodiments, other proximity-determining devices may be used to identify parties in the vicinity of a party to a call. For instance, RFID may be used to track the location of residents within a controlled-environment facility, and such location information may be time-synchronized with an ongoing call. For instance, such location information may be supplied to a call processing system and the call processing system may use the location information to determine parties within the vicinity of a resident during various times of an ongoing call on which the resident is participating. The call processing system may thus base its monitoring activities and/or responsive actions at least in part on the identified residents that are in the vicinity of the resident participating on the call.

Further, in certain embodiments, certain well-known voices (such as those of radio and television personalities, etc.) may have voice prints stored to the call processing system so that they can be identified in the background audio. This may aid the call processing system in determining that an unauthorized party is not present in the background audio, but rather the voice heard in the background audio corresponds to that of a well-known personality.

Also, in certain embodiments, different portions of a call are divided into respective channels. For instance, a separate channel may be used for each side of the call. Thus, in an audible telephony call, a call processing system according to an embodiment of the present invention may monitor audio on each respective channel of the call. In this manner, audio regarding parties participating on the call and/or background audio can be determined with regard to the side of the call on which such audio occurs. Further, in certain embodiments, a control channel is used to correlate the multiple channels together (e.g., in a temporal manner). An example of processing a call using such multiple channels with a control channel is described further in concurrently filed and commonly assigned U.S. patent application Ser. No. 11/603,938, titled "SYSTEM AND METHOD FOR MULTI-CHANNEL RECORDING".

Certain embodiments of the present invention further comprise storing the biometric identification data determined for parties to a call. For instance, once a biometric print is determined for a party, it may be stored to a computer-readable medium and associated with the respective party to which it relates. In this manner, the biometric print may be re-used for monitoring of future calls involving the respective party in certain embodiments. Further, if an unauthorized party participates during a monitored call, the unauthorized party's biometric data (e.g., audio of the unauthorized party's voice) may be compared against stored biometric prints (e.g., stored voice prints) in attempt to identify such unauthorized party. Additionally, a record of a given call may be stored to a computer-readable medium, which may comprise the corresponding biometric identification determined during monitoring of the call. Thus, biometric identification determined during a given monitored call may be stored to a computer-readable medium in a manner such that it is associated with the corresponding monitored call. Thus, if an investigator desires to later retrieve the call record and review the parties participating on the call, including the biometric identification performed during the call, he can do so via the call's stored record. In certain embodiments, the call is broken into multiple channels, as mentioned above, and the multiple channels, along with the control channel, may be stored in the call record. Thus, each channel (e.g., each side of the call) may be later reviewed individually from the call record, if so desired.

In certain embodiments, a confidence score is assigned to a determined biometric print and/or monitored biometric data from communication of a call based, for example, on quality of the communication. For instance, on an audible call in which one or more sides of the call has a lot of background noise, the background noise make impact the accuracy of voice recognition logic of the call processing system. Thus, the level of background noise and/or other factors impacting the quality of the communication being monitored may be used by the call processing system to assign a respective confidence score to the determined biometric identification of a party participating on the call. Thus, a determination as to whether an anomaly is detected on a call may be determined based at least in part on the confidence score assigned to a biometric identification. For instance, if the call processing system determines that captured audio fails to match a voice print of an authorized party of the call, the confidence score assigned to this determined failure may be analyzed to determine whether to trigger a responsive action. For instance, if the audio quality of the call is low, thus resulting in a low confidence score assigned to the determined failure, the call processing system may determine that the failure may not be reflective of a change in the parties to the call but is instead likely due to the low quality of the audio captured. A responsive action may be triggered only upon a determination of a voice that fails to match a voice print of an authorized party to the call with a corresponding confidence score above a predefined threshold, in certain embodiments.

While various embodiments are described above in which communication between parties to a call is monitored for biometric data (e.g., audio, video, handwriting, etc.) to be used in performing biometric identification of parties participating on the call, in certain embodiments biometric data may also be captured external to the communication between the parties. For instance, co-pending and commonly assigned U.S. patent application Ser. No. 11/480,258 titled "SYSTEMS AND METHODS FOR IDENTITY VERIFICATION USING CONTINUOUS BIOMETRIC MONITORING", the disclosure of which is hereby incorporated herein by reference, discloses exemplary systems and methods in which biometric identification information (e.g., fingerprints, etc.) are captured by a communication device. In certain embodiments, such biometric identification information captured external to the actual communication between the parties to a call may also be used for monitoring the identification of parties participating on the call. For instance, such biometric identification information captured external to the actual communication may, in certain embodiments, be communicated during a call to the call processing system, and the call processing system may base its determinations of the parties participating on the call at least in part on such externally captured biometric identification information.

In certain embodiments, other proximity-determining devices may be used to identify parties in the vicinity of a party to a call. For instance, RFID may be used to track the location of residents within a controlled-environment facility, and such location information may be time-synchronized with an ongoing call. For instance, such location information may be supplied to a call processing system and the call processing system may use the location information to determine parties within the vicinity of a resident during various times of an ongoing call on which the resident is participating. The call processing system may thus base its monitoring activities and/or responsive actions at least in part on the identified residents that are in the vicinity of the resident participating on the call.

When implemented in software, elements of the present invention are essentially the code segments for implementing such elements. The program or code segments can be stored in a computer-readable medium or transmitted by a computer data signal embodied in a carrier wave, or a signal modulated by a carrier, over a transmission medium, as examples. The "computer-readable medium" may include any medium that can store or transfer information. Examples of the computer-readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The exemplary operational flow of FIG. 3 may, for example, be implemented via software executable by a processor. Further, various operational aspects described herein for the call processing system, such as the biometric printing logic and call monitoring process, may be implemented via software executable by a processor.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   determining a biometric print for at least one authorized party to a call;
   capturing biometric information for the at least one authorized party during the call;
   using a location tracking device, identifying a third-party in the physical vicinity of the authorized party while the call is ongoing;
   in response to the identification of the third-party, monitoring background audio for the call; and
   detecting, based at least in part on the determined biometric print or the background audio, an anomaly in the call.

2. The method of claim 1 wherein the capturing biometric information during the call comprises: capturing, from a communication by the at least one authorized party during the call, biometric data from which said biometric information is derived.

3. The method of claim 1 wherein the biometric print comprises an audible-based biometric print.

4. The method of claim 3 wherein the captured biometric information comprises audio.

5. The method of claim 3, further comprising comparing the background audio to voice prints of well-known voices of radio or television personalities to determine that another third-party is not present in the physical vicinity of the at least one authorized party.

6. The method of claim 1 wherein the biometric print comprises a video-based biometric print.

7. The method of claim 6 wherein the captured biometric information comprises video.

8. The method of claim 1 wherein the biometric print comprises a handwriting-based biometric print.

9. The method of claim 8 wherein the captured biometric information comprises handwritten communication.

10. The method of claim 1 wherein said anomaly comprises a new party participating on the call.

11. The method of claim 1 comprising: determining said biometric print for an authorized party on each side of the call.

12. The method of claim 11 comprising:
    capturing said biometric information for parties on each side of the call during the call; and
    monitoring the captured biometric information during the call to detect, based at least in part on the determined biometric prints, said anomaly in the call.

13. A method, comprising:
    determining a first biometric print for a first party to a call;

determining a second biometric print for a second party to the call;

capturing, during the call, biometric information for parties participating on the call;

monitoring a background noise level on the call;

comparing the captured biometric information to the determined biometric prints to generate a biometric identification of the first party and the second party;

assigning a confidence score to the biometric identification, the confidence score determined by the background noise level detected on the call;

detecting, based at least in part on the comparing, a new party participating on the call in the physical vicinity of the first or second parties, the detecting based on the confidence score; and initiating one of a plurality of responsive actions based upon an identity of the new party.

14. The method of claim 13, wherein the first or second biometric print is of a type selected from the group consisting of: audible-based biometric print, video-based biometric print, and handwriting-based biometric print.

15. The method of claim 14, further comprising comparing background audio to voice prints of radio or television personalities to determine that another new party is not present in the physical vicinity of the first or second parties.

16. The method of claim 15 wherein the first and second biometric prints are of the same type.

17. The method of claim 15 wherein the first and second biometric prints are of different types.

18. The method of claim 13 wherein the first and second biometric prints comprise voice prints for the first and second parties to the call.

19. A method, comprising:

determining a voice print for each authorized party to a call;

monitoring audio during the call to detect, based at least in part on the determined voice prints, an anomaly in the call;

monitoring the audio during the call to identify background audio generated by a source other than an authorized party to the call; and comparing the background audio to voice prints of well-known voices of radio or television personalities to determine that an unauthorized party is not present in the physical vicinity of at least one of the authorized parties.

20. The method of claim 19 wherein said anomaly comprises a new party participating on the call.

21. The method of claim 19 wherein said determining a voice print comprises:

capturing audio from each authorized party on the call; and generating corresponding voice prints that uniquely identify the respective authorized parties on each side of the call.

22. A method, comprising:

determining a first voice print for a first party to a call;

determining a second voice print for a second party to the call;

monitoring a location for at least one party to the call;

identifying third parties who are at the location;

comparing audio captured during the call to the determined voice prints;

monitoring a background noise level on the call;

assigning a confidence score to the audio captured during the call, the confidence score determined by the background noise level detected on the call;

detecting, based at least in part on the comparing and on the confidence score, that a new party participating on the call is in the physical vicinity of the first or second parties; and initiating one of a plurality of different responsive actions selected based upon an identity of the new party, the different responsive actions selected from the group consisting of: notifying appropriate personnel, terminating the call, and recording the call for investigative purposes.

23. The method of claim 22, further comprising comparing background audio to voice prints of well-known voices of radio or television personalities to determine that another new party is not present in the physical vicinity of the first or second parties.

24. The method of claim 22 wherein at least one of the first party and second party is a resident of a controlled-environment facility.

25. A system, comprising:

biometric printing logic operable to generate a biometric print identifying at least one party on a call;

call monitoring logic operable to compare the generated biometric print for the at least one party with biometric data captured for parties participating during the call to detect a change in parties to the call;

a radio frequency identification (RFID) system for tracking locations of inmates in a controlled environment facility, the inmates including an inmate party to the call;

background audio logic for monitoring background audio for the at least one party on the call;

determining logic operable, based upon the background audio, for determining when a third party is physically near the at least one authorized party during the call; and the call monitoring logic operable to time-synchronize the locations to determine the identity of inmates within a physical vicinity of the inmate party to the call, and to base a monitoring activity or responsive action at least in part on the identity of one or more inmates within the physical vicinity of the inmate party to the call.

26. The system of claim 25 wherein the biometric printing logic is operable to generate a biometric print identifying authorized parties on each side of the call; and wherein the call monitoring logic is operable to compare generated biometric prints for the authorized parties of the call with biometric data captured for parties participating during the call to detect the change in parties to the call.

27. The system of claim 25, wherein said call monitoring logic is further configured to compare background audio to voice prints of well-known radio or television personalities to determine that an unauthorized party is not present in the physical vicinity of the at least one party.

28. The system of claim 27 wherein said call monitoring logic comprises: logic operable to compare generated voice prints for the authorized parties of the call with audio captured during the call to detect the change in parties to the call.

29. The system of claim 26 wherein said biometric printing logic comprises: video-based biometric printing logic operable to generate a video-based biometric print for the authorized parties on each side of the call.

30. The system of claim 29 wherein the video-based biometric print comprises at least one selected from the group consisting of: face print, iris print, and retina print.

31. The system of claim 29 wherein said call monitoring logic comprises: logic operable to compare generated video-based biometric prints for the authorized parties of the call with video captured during the call to detect the change in parties to the call.

32. The system of claim 26 wherein said biometric printing logic comprises: handwriting-based biometric printing logic operable to generate a handwriting-based biometric print for the authorized parties on each side of the call.

33. The system of claim 32 wherein said call monitoring logic comprises: logic operable to compare generated handwriting-based biometric prints for the authorized parties of the call with handwriting communication captured during the call to detect the change in parties to the call.

34. A system, comprising:
a processor; and
a memory coupled to the processor, the memory having program instructions stored thereon that, upon execution by the processor, cause the system to:
  determine a biometric print for at least one authorized party to a video conference call;
  capture biometric information for the at least one authorized party during the video conference call;
  identify a third-party while the video conference call is ongoing;
  compare background audio to voice prints of well-known radio or television personalities to determine that the identified third-party is not present in the physical vicinity of the at least one authorized party;
  detect, based at least in part on the determined biometric print, an anomaly in the video conference call; and
  initiate at least one of a plurality of different responsive actions selected from the group consisting of: notifying appropriate personnel, terminating the video conference call, and recording the video conference call for investigative purposes.

35. The method of claim 1, further comprising:
initiating one of a plurality of possible responsive actions based upon the identity of the third-party.

36. The method of claim 22, further comprising:
determining the location for the at least one party to the call using a radio frequency identification (RFID) system; and
identifying third parties who are at the location using the RFID system.

* * * * *